US010516686B2

(12) United States Patent
Jover et al.

(10) Patent No.: US 10,516,686 B2
(45) Date of Patent: Dec. 24, 2019

(54) MALWARE AND ANOMALY DETECTION VIA ACTIVITY RECOGNITION BASED ON SENSOR DATA

(71) Applicant: AT&T Intellectual Property I, L.P., Atlanta, GA (US)

(72) Inventors: Roger P. Jover, New York, NY (US); Ilona Murynets, Rutherford, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/620,495

(22) Filed: Jun. 12, 2017

(65) Prior Publication Data
US 2017/0279842 A1    Sep. 28, 2017

Related U.S. Application Data

(63) Continuation of application No. 15/132,219, filed on Apr. 18, 2016, now Pat. No. 9,680,854, which is a
(Continued)

(51) Int. Cl.
*H04L 29/06*     (2006.01)
*H04W 12/12*    (2009.01)
*H04W 12/00*    (2009.01)

(52) U.S. Cl.
CPC ........ *H04L 63/1425* (2013.01); *H04L 63/145* (2013.01); *H04L 63/1416* (2013.01); *H04L 63/1441* (2013.01); *H04W 12/12* (2013.01); *H04W 12/1208* (2019.01); *H04L 63/14* (2013.01); *H04L 2463/144* (2013.01); *H04W 12/00504* (2019.01); *H04W 12/00508* (2019.01)

(58) Field of Classification Search
CPC ............. H04L 63/1425; H04L 63/1416; H04L 63/1441; H04L 63/145; H04L 63/14; H04L 2463/144; H04W 12/12
See application file for complete search history.

(56) References Cited

U.S. PATENT DOCUMENTS 7,496,348 B2    2/2009  Srey et al.
7,921,063 B1    4/2011  Quinlan
(Continued)

OTHER PUBLICATIONS

Dini et al. "MADAM: a multi-level anomaly detector for android malware." Computer Network Security. Springer Berlin Heidelber, 2012. 240-253.
(Continued)

*Primary Examiner* — Techane Gergiso

(57) ABSTRACT

A system for malware and anomaly detection via activity recognition based on sensor is disclosed. The system may analyze sensor data collected during a selected time period from one or more sensors that are associated with a device. Once the sensor data is analyzed, the system may determine a context of the device when the device is in a connected state. The system may determine the context of the device based on the sensor data collected during the selected time period. The system may also determine if traffic received or transmitted by the device during the connected state is in a white list. Furthermore, the system may transmit an alert if the traffic is determined to not be in the white list or if the context determined for the device indicates that the context does not correlate with the traffic.

20 Claims, 7 Drawing Sheets

Related U.S. Application Data continuation of application No. 14/070,875, filed on Nov. 4, 2013, now Pat. No. 9,319,423.

(56) References Cited

U.S. PATENT DOCUMENTS

| | | | |
|---|---|---|---|
| 8,087,085 B2 | 12/2011 | Hu et al. | |
| 8,627,469 B1 | 1/2014 | Chen et al. | |
| 9,104,886 B1* | 8/2015 | Dolbakian | G06F 21/62 |
| 9,319,423 B2 | 4/2016 | Jover et al. | |
| 9,680,854 B2 | 6/2017 | Jover | |
| 2006/0265747 A1 | 11/2006 | Judge | |
| 2007/0079379 A1 | 4/2007 | Sprosts et al. | |
| 2007/0123214 A1 | 5/2007 | Mock | |
| 2008/0082662 A1 | 4/2008 | Dandliker et al. | |
| 2009/0119740 A1 | 5/2009 | Alperovitch et al. | |
| 2009/0267762 A1 | 10/2009 | Shyu | |
| 2010/0058470 A1 | 3/2010 | Kim | |
| 2010/0075632 A1 | 3/2010 | Kim | |
| 2010/0115040 A1 | 5/2010 | Sargent et al. | |
| 2010/0214149 A1 | 8/2010 | Kuhn | |
| 2010/0235915 A1 | 9/2010 | Memon et al. | |
| 2010/0330954 A1 | 12/2010 | Manning Cassett et al. | |
| 2011/0006190 A1* | 1/2011 | Alameh | G01S 7/484 |
| | | | 250/206.1 |
| 2011/0040825 A1 | 2/2011 | Ramzan et al. | |
| 2011/0239302 A1 | 9/2011 | Choi | |
| 2012/0047247 A1* | 2/2012 | Piernot | G06F 16/90335 |
| | | | 709/224 |
| 2012/0278886 A1* | 11/2012 | Luna | G06F 21/552 |
| | | | 726/22 |
| 2013/0031599 A1* | 1/2013 | Luna | G06F 21/554 |
| | | | 726/1 |
| 2013/0097660 A1 | 4/2013 | Das et al. | |
| 2013/0110992 A1* | 5/2013 | Ravindra | H04W 4/185 |
| | | | 709/220 |
| 2013/0111547 A1 | 5/2013 | Kraemer | |
| 2013/0212678 A1 | 8/2013 | Wurster | |
| 2013/0246605 A1 | 9/2013 | Mahadik et al. | |
| 2013/0297547 A1* | 11/2013 | Ding | G06N 5/02 |
| | | | 706/46 |
| 2013/0298244 A1* | 11/2013 | Kumar | G06F 21/52 |
| | | | 726/25 |
| 2014/0073302 A1* | 3/2014 | Trethewey | H04W 52/0251 |
| | | | 455/418 |
| 2014/0075496 A1* | 3/2014 | Prakash | G06F 21/6218 |
| | | | 726/1 |
| 2014/0129560 A1* | 5/2014 | Grokop | G06N 5/043 |
| | | | 707/737 |
| 2014/0136214 A1* | 5/2014 | Winter | G10L 15/22 |
| | | | 704/275 |
| 2014/0189784 A1 | 7/2014 | Marino | |
| 2014/0222323 A1* | 8/2014 | Purushothaman | |
| | | | G06Q 30/0201 |
| | | | 701/117 |
| 2014/0281523 A1* | 9/2014 | Golino | H04L 63/0428 |
| | | | 713/168 |
| 2014/0283066 A1 | 9/2014 | Teddy et al. | |
| 2014/0359777 A1* | 12/2014 | Lam | G06F 21/577 |
| | | | 726/25 |
| 2015/0097731 A1* | 4/2015 | Russell | G01S 19/48 |
| | | | 342/450 |
| 2015/0121449 A1 | 4/2015 | CP et al. | |
| 2015/0262208 A1* | 9/2015 | Bjontegard | G06Q 30/0205 |
| | | | 705/7.31 |

OTHER PUBLICATIONS

Schmidt et al. "Monitoring smartphones for anomaly detection." Mobile Networks and Applications 14.1 (2009) 92-106.

Schmidt, Detection of Smartphone Malware. Diss. Universitätsbibliothek, 2011.

* cited by examiner

400

MALWARE AND ANOMALY DETECTION VIA ACTIVITY RECOGNITION BASED ON SENSOR DATA This application is a continuation of U.S. patent application Ser. No. 15/132,219, filed Apr. 18, 2016, now U.S. Pat. No. 9,680,854, which is a continuation of U.S. patent application Ser. No. 14/070,875, filed Nov. 4, 2013, now U.S. Pat. No. 9,319,423, all of which are herein incorporated by reference in their entirety.

FIELD OF THE INVENTION

The present application relates to malware detection, anomaly detection, and sensor technologies, and more particularly, to a system for providing malware and anomaly detection via activity recognition based on sensor data.

BACKGROUND

In today's society, users utilize network and other service providers to gain access to the Internet, access software services, request and receive various types of content, access software applications, and perform a variety of other tasks and functions. Additionally, users are increasingly utilizing mobile devices, such as, but not limited to, smartphones, tablets, phablets, laptops, and other mobile devices to access such services, applications, and content. However, as the use of mobile devices has increased, mobile malware such as, but not limited to, computer viruses, ransomware, worms, trojan horses, keyloggers, spyware, adware, and other malicious programs has exponentially increased. Such malware may be utilized by malware developers, hackers, and fraudsters to disrupt communications and to compromise personal, financial or other information associated with such users. Additionally, the disruption of communications and the theft of information caused by malware often occur without the users even knowing that they occurred. For example, a user may unwittingly download malware onto their mobile device, which can be utilized by a hacker to access the user's social security number, personal information, or other confidential information.

Currently, instead of just using malware to gain access to devices and information, malware developers and hackers are increasingly using malware for financial gain. For example, GGTracker is a type of malware that fraudsters incorporate into a legitimate online mobile software application, which, when installed by users onto their mobile devices, performs a variety of background operations that the user does not know are occurring. When the user starts using the online mobile software application, the GGTracker starts a background service that connects with a server owned by the fraudster to subscribe the user to legitimate or illegitimate services, which typically cost the user a monthly fee. The users are typically unaware of the subscription of these legitimate or illegitimate services until they see charges on their monthly phone statement or internet statement.

As another example, SpamSoldier is a type of malware that turns smartphones running certain operations systems into a member of a spamming botnet. Legitimate users are tricked into downloading an application in a similar fashion as the GGTracker, and the users typically end up believing that the application is legitimate. However, in the background, the application downloads a list of target numbers and a list of messages, and then spams messages to the phone numbers in the list of target numbers. Such spamming typically causes substantial text message charges to the users, even though the users did not actually send the messages themselves. Once the users find out that they been defrauded, the users spend substantial amount of time with their network providers to try to rectify the situation.

The current reactive approach for malware detection and mitigation typically involves removing suspicious applications from markets only after they have infected countless numbers of user devices and after users have been charged for fraudulent services. Additionally, network and service providers often have to spend tremendous amount of human, network, and financial resources to conduct traffic analyses and forensic studies once the infections have occurred so as to mitigate the infections. While deep packet inspection technologies offered by network providers provide an effective way to detect infected devices, such technologies are often resource-intensive and often involve directly monitoring users' traffic and activities.

SUMMARY

A system and accompanying methods for providing malware and anomaly detection via activity recognition based on sensor data are disclosed. In particular, the system and methods may utilize sensor data to determine a context of a device, particularly when the device is in a connected state, so as to detect malware and anomalies that may be affecting the device. In order to accomplish this, the systems and methods may involve retrieving sensor data from one or more sensors associated with the device, such as, but not limited to, accelerometers, gyroscopes, compasses, light sensors, and proximity sensors. The sensor data may be retrieved when the device is in a connected state, such as when the device is connected to another device, when the device is receiving or transmitting data, or at other designated occasions. Additionally, the system and methods may involve determining the type of connection the device has made while the device is in the connected state. Once the sensor data and connection information are obtained, the system and methods may involve determining a context for the device. The context of the device may include, but is not limited to, an indication of a physical orientation of the device when the device is in the connected state, an indication of a position of the device when the device is in the connected state, an indication as to how the device is being used when in the connected state, an indication of whether the device is being used by a user when in the connected state, or any combination thereof.

Once the context for the device is determined, the system and methods may include obtaining other data associated with the device. For example, the other data may include, but is not limited to, information that identifies a destination for receiving traffic that is sent from the device when the device is in the connected state, information that identifies a source of traffic that is being delivered to the device, information that indicates whether or not a source or destination of traffic is in a contact list of the device, information that identifies the type of traffic that is being sent to or from the device, other information, and any combination thereof. Based on the context of the device and the other information, the system and methods may include transmitting an alert if traffic is being sent to or received from an unknown destination, if the context determined for the device indicates that the context does not correlate with the traffic, if the traffic is associated with malware, if an anomaly has been detected, or any combination thereof. Furthermore, the system and methods may provide an option to block or otherwise prevent any detected malware, traffic, or a combination thereof.

In one embodiment, a system for providing malware and anomaly detection via activity recognition based on sensor data is disclosed. The system may include a memory that stores instructions and a processor that executes the instructions to perform various operations of the system. The system may analyze sensor data collected during a selected time period from one or more sensors associated with a device. Once the sensor data is analyzed, the system may determine a context of the device when the device is in a connected state. The context of the device may be determined by the system based on the sensor data collected during the selected time period. Then, the system may determine if traffic received or transmitted by the device during the connected state is in a white list. Finally, the system may transmit an alert if the traffic is determined to not be in the white list, or if the context determined for the device indicates that the context does not correlate with the traffic received or transmitted.

In another embodiment, a method for providing malware and anomaly detection via activity recognition based on sensor data is disclosed. The method may include utilizing a memory that stores instructions, and a processor that executes the instructions to perform the various functions of the method. The method may include analyzing sensor data collected during a selected time period from one or more sensors associated with a device. Additionally, the method may include determining a context of the device when the device is in a connected state. The context of the device may be determined based on the sensor data collected during the selected time period. Furthermore, the method may include determining if traffic received or transmitted by the device during the connected state is in a white list. Moreover, the method may include transmitting an alert if the traffic is not in the white list or if the context determined for the device indicates that the context does not correlate with the traffic.

According to yet another embodiment, a computer-readable device having instructions for providing differentiated services to traffic flows of a content distribution network is provided. The computer instructions, which when loaded and executed by a processor, may cause the processor to perform operations including: analyzing sensor data collected during a selected time period from at least one sensor associated with a device; determining a context of the device when the device is in a connected state, wherein the context of the device is determined based on the sensor data collected during the selected time period; determining if traffic received or transmitted by the device during the connected state is in a white list; and transmitting an alert if the traffic is not in the white list or if the context determined for the device indicates that the context does not correlate with the traffic.

These and other features of the systems and methods for providing malware and anomaly detection via activity recognition based on sensor data are described in the following detailed description, drawings, and appended claims.

BRIEF DESCRIPTION OF THE DRAWINGS

FIG. 3 is a spreadsheet illustrating sample sensor data analyzed by the system of FIG. 1 to assist in the detection of malware and anomalies.

DETAILED DESCRIPTION OF THE INVENTION

A system 100 and accompanying methods for providing malware and anomaly detection via activity recognition based on sensor data are disclosed, as shown in FIGS. 1-7. In particular, the system 100 and methods may utilize sensor data to determine a context of a device 102, such as when the device 102 is in a connected state. The sensor data may be utilized to detect malware and various types of anomalies that may be affecting the device 102. In order to do so, the system 100 and methods may involve retrieving the sensor data from one or more sensors of the device 102 when the device is in the connected state. The sensors may include, but are not limited to, accelerometers, gyroscopes, compasses, light sensors, and proximity sensors. Additionally, the system 100 and methods may involve determining the type of connection the device has made while the device is in the connected state. Once the sensor data and connection information are obtained, the system 100 and methods may involve determining a context for the device 102. The context of the device 102 may include, but is not limited to, an indication of a physical orientation of the device 102 when the device 102 is in the connected state, an indication of a position of the device 102 when the device 102 is in the connected state, an indication as to how the device 102 is being used when the device 102 is in the connected state, an indication of whether the device 102 is being used by a user when in the connected state, or any combination thereof.

Once the context for the device 102 is determined, the system 100 and methods may include obtaining other data and information associated with the device 102. For example, the other information may include, but is not limited to, information that identifies a destination for receiving traffic that is sent from the device 102 when the device 102 is in the connected state, information that identifies a source of traffic that is being delivered to the device 102, information that indicates whether or not a source or destination of traffic is in a contact list of the device 102, information that identifies the type of traffic that is being sent to or from the device 102, other information, and any combination thereof. Based on the context of the device 102 and the other information, the system 100 and methods may include transmitting an alert if traffic is being sent to or received from an unknown destination, if the context determined for the device 102 indicates that the context does not correlate with the traffic, if the traffic is associated with malware, if an anomaly has been detected, or any combination thereof. Furthermore, the system 100 and methods may provide a user of the device 102 with the ability to block or otherwise prevent any detected malware, traffic, or a combination thereof, from accessing the device 102.

Figure 1:
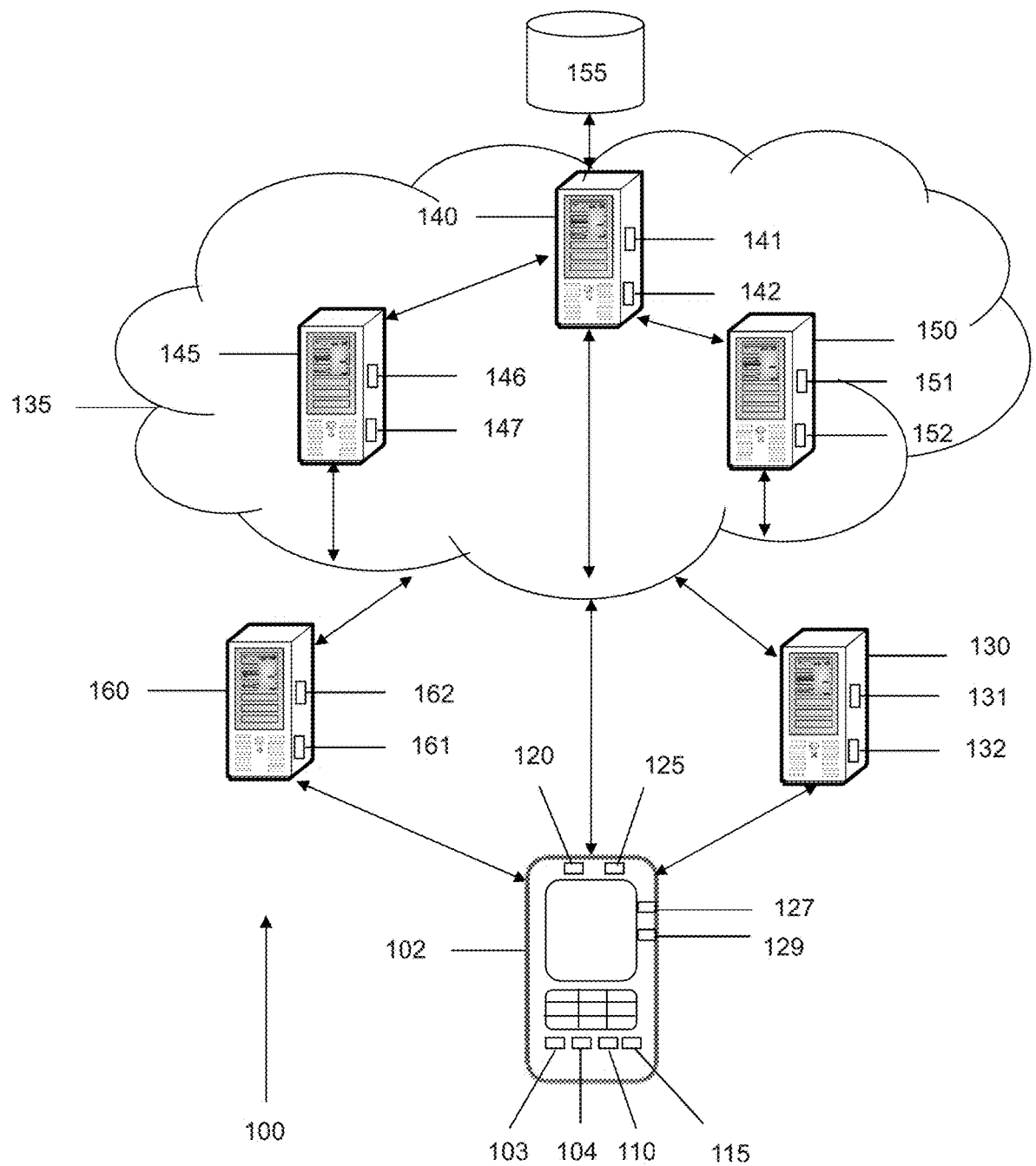
FIG. 1 is a schematic diagram of a system for providing malware and anomaly detection via activity recognition based on sensor data according to an embodiment of the present disclosure.
Figure 2:
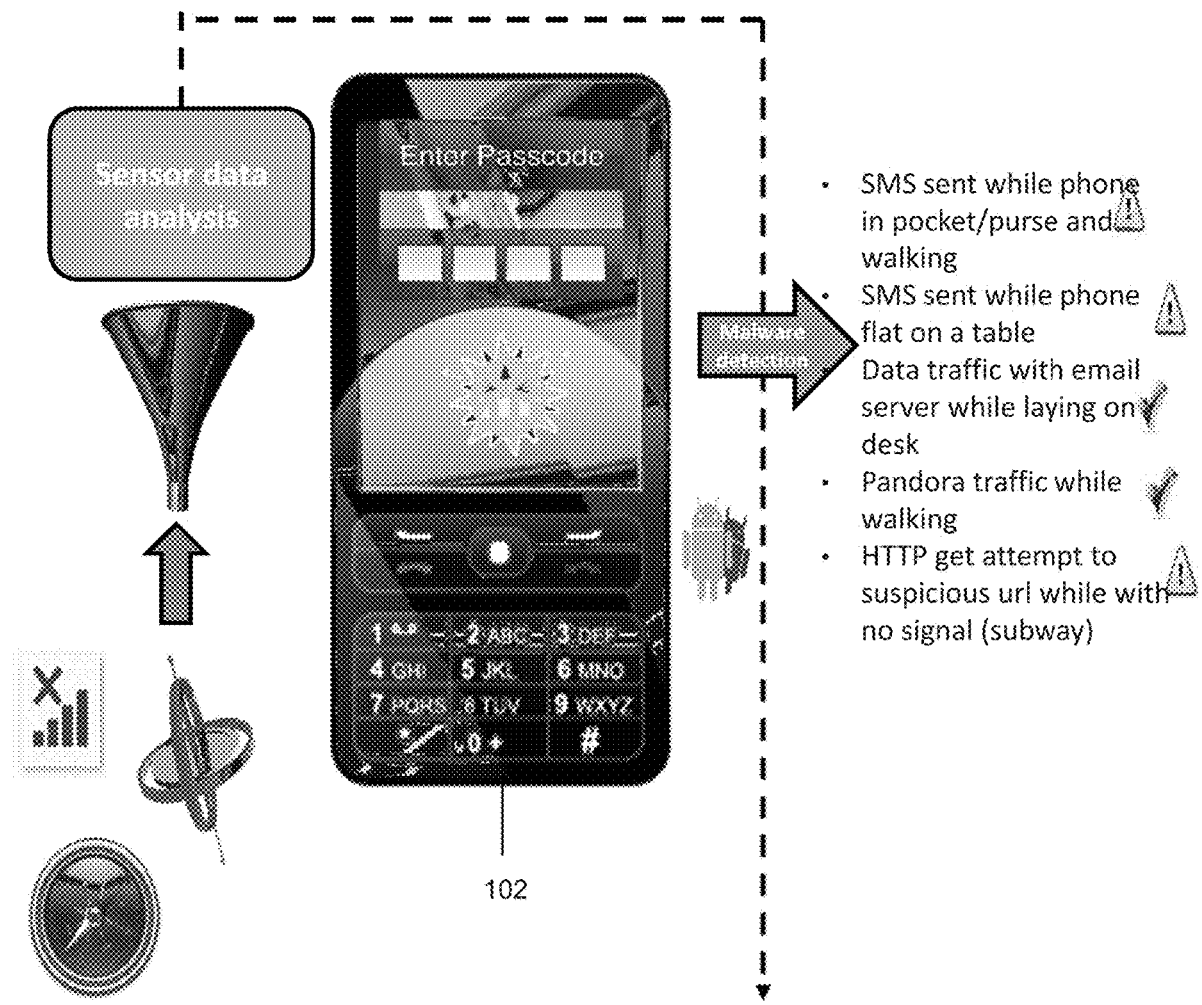
FIG. 2 is a schematic diagram of a device from the system of FIG. 1, which shows sample scenarios that trigger and do not trigger alerts to the device from the system.
Figure 4:
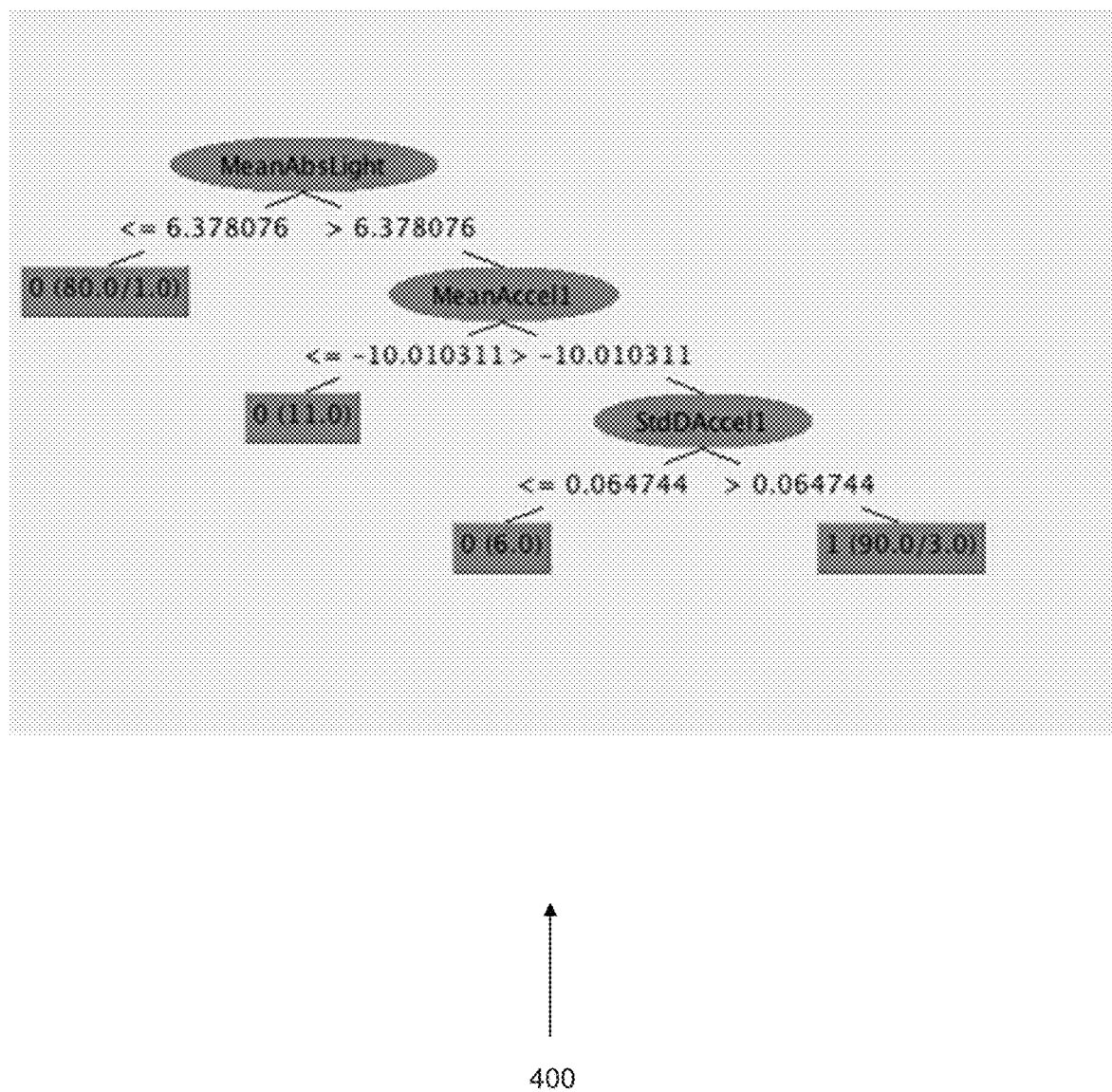
FIG. 4 is a sample classification tree utilized in the system of FIG. 1.

Referring to the drawings and in particular to FIGS. 1-5, the system 100 may provide malware and anomaly detection via activity recognition that is based on analyzed sensor data. The system 100 may be configured to support, but is not limited to supporting, content delivery services, cloud computing services, voice-over-internet protocol services (VoIP), software as a service (SaaS) applications, gaming applications and services, productivity applications and services, mobile applications and services, and any other computing applications and services. The system 100 may include a user that utilizes device 102 to access, download, and upload various types of applications, content, data, and services. In certain embodiments, the device 102 may be a mobile device, a computer, a server, a smartphone, a computer tablet, a phablet, or any other computing device. In FIG. 1, device 102 is illustratively shown as a smartphone. In one embodiment, the device 102 may include a memory 103 that includes instructions, and a processor 104 that executes the instructions from the memory 103 to perform various operations that are performed by the device 102. The processor 104 may be hardware, software, or a combination thereof.

Notably, the user may utilize the device 102 to access and interact with the various devices, systems, and software applications, such as mobile applications, both inside the system 100 and outside the system 100. Additionally, the user may utilize the device 102 to obtain audio content, video content, text content, image content, gaming content, web content, any other type of content from various content sources. The user may utilize device 102 to perform a variety of tasks and functions using the software applications. Also, the user may utilize the device 102 to make or receive phone calls, send or receive text messages, send or receive media content, or perform a variety of other operations that may be performed by traditional mobile devices, computers, or a combination thereof. The device 102 may be configured to receive data traffic from destination device 130 or transmit data traffic to destination device 130. In certain embodiments, destination device 130 may be a known destination, however, in other embodiments, destination device 130 may be an unknown destination. A known destination and an unknown destination may be either trusted or untrusted. In one embodiment, the destination device 130 may be any type of computing device and may include a memory 131 that includes instructions, and a processor 132 that executes the instructions from the memory 131 to perform various operations that are performed by the destination device 130. The processor 132 may be hardware, software, or a combination thereof.

The device 102 may include one or more sensors that collect data and information. For example, the device 102 may include an accelerometer 110, which may be utilized to measure a rate of acceleration of the device 102. In one embodiment, the rate of acceleration may be utilized by the device 102 to determine whether or not the display orientation of content shown on the screen of device 102 should be adjusted, how quickly the display orientation of content displayed on the device 102 should be adjusted, or both. For example, the accelerometer 110 may be utilized to change the display orientation from a landscape mode to a portrait mode. Additionally, the device 102 may include a gyroscope 115, which may be utilized to sense the position of the device 102 relative to the force of gravity. As an example, the position data from the gyroscope 115 may be utilized to adjust the orientation of the content displayed on the screen of the device 102 when the position of the device 102 is changed by more than a predetermined threshold amount. The device 102 may also include an orientation sensor 120 that may be utilized by the device 102 to measure the strength and direction of magnetic fields in a vicinity of the device 102 so as to determine a direction in which the device 102 is pointing. For example, the orientation sensor 120 may include a magnetometer that indicates a North, South, East, or West direction based on the detection of the magnetic fields.

In addition to the accelerometer 110, the gyroscope 115, and the orientation sensor 120, the device 102 may also include a proximity sensor 125, which may be utilized by the device 102 to detect the presence of nearby objects. In one embodiment, the proximity sensor 125 may emit an electromagnetic field or a beam of electromagnetic radiation, and determine changes in the field or in a return signal. In one embodiment, the proximity sensor 125 may be configured to detect the presence of an object that is close to the device 102 without actually requiring physical contact with the object. In one embodiment, the proximity sensor may be utilized to deactivate a display or touchscreen of the device 102 when the device 102 is brought near the face of the user, such as during a telephone call, so as to avoid accidental inputs triggered by contact of the user's face with the device 102. Also, the device 102 may include a light sensor 127, which may be utilized by the device 102 to detect ambient or other light. In one embodiment, the light sensor 127 may be utilized to adjust the brightness level of the display of the device 102 so as to save power. Furthermore, the device 102 may include a global positioning system (GPS) 129, which may be utilized by the device 102 to provide location and time information for the device 102. For example, the GPS 129 may provide an indication of the device's 102 position on the earth and what time zone the device 102 is in. In other embodiments, the device 102 may include any other type of suitable sensor.

The device 102 may also include an application, which may perform some or all of the operations of the system 100. In certain embodiments, the application may be a software application that may be an internet-based application, a browser application, a mobile application, a social media application, or any other type of application. In one embodiment, a portion of the application may be configured to execute directly on the device 102, however, in a preferred embodiment, the entire application and its corresponding functions may be configured to execute directly on device 102. In certain embodiments, all of the operations of the application may be performed on the device 102 without connecting to any of the other devices in the system 100. However, in other embodiments, the application may be configured to execute on other devices and components in the system 100 as well. For example, the application may be hosted, supported, and executed by using any combination of the servers 140, 145, and 150 in the communications network 135 or outside of the communications network 135. In one embodiment, the application may be accessible by the device 102 via a web page or user interface that that may be hosted by a combination of the servers 140, 145, and 150.

In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices, or any other suitable computing devices.

The communications network 135 of the system 100 may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. The communications network 135 may also include and be connected to a wireless network, an ethernet network, a satellite network, a broadband network, a cellular network, a private network, a cable network, the Internet, an internet protocol network, a multiprotocol label switching (MPLS) network, a content distribution network or any combination thereof. In one embodiment, the communications network 135 may be part of a single autonomous system that is located in a particular geographic region, or be part of multiple autonomous systems that span multiple geographic regions.

The database 155 of the system 100 may be utilized to store and relay information that traverses the system 100, cache content that traverses the system 100, store data about each of the devices in the system 100, and perform any other typical functions of a database. In one embodiment, the database 155 may be connected to or reside within the communications network 135. Additionally, the database 155 may include a processor and memory or be connected to a processor and memory to perform the various operation associated with the database 155. In one embodiment, the database 155 may be connected to the servers 140, 145, and 150, server 160, and device 102. The database 155 may also store information traversing the system 100, the sensor data from the sensors 110, 115, 120, 125, 127, and 129, data relating to the application of the device 102, and data responsive to requests traversing the system 100. Furthermore, the database 155 may be configured to process information and queries sent to it by the application of the device 102, the device 102 itself, or by any other device in the system 100.

Notably, the application may be utilized to activate the sensors 110-129 at the beginning of a selected period of time and deactivate the sensors 110-129 at the end of the selected period of time. In certain embodiments, the sensors 110-129 may be activated when the device is in a connected state and deactivated when the device 120 is not in a connected state. The device 102 may be in a connected state when the device 102 is connected to another device such as destination device 130, when the device 102 is transmitting data traffic, when the device 102 is receiving data traffic, or any combination thereof. For example, if the device 102 is transmitting or receiving short message service (SMS) traffic, internet protocol (IP) traffic or any other type of traffic, the device 102 may be in a connected state.

When the sensors 110-129 are activated during the device's 102 connected state, the sensors 110-129 can transmit the sensor data generated by each of the sensors 110-129 to the application for processing. In one embodiment, the application can send instructions to the sensors 110-129, which indicate when the sensors 110-129 should stop generating and gathering the sensor data. In certain embodiments, an optimal sensor data gathering period may be when the system 100, application, or a combination thereof, are in a training phase. The training phase may occur when the system 100 and application are determining the typical behavior of the user, the device 102, or a combination thereof. Additionally, the application can send instructions to cause the sensors 110-129 to stop gathering the sensor data as soon as the device 102 is no longer in a connected state, when the device 102 has gone into a sleep mode, or at the end of the selected time period. In a preferred embodiment, the sensors 110-129 may only activated for a short time period, such as a few seconds, to ensure minimal power consumption by the application. In certain embodiments, the application may activate or deactivate the sensors 110-129 any number of times during a day, and the application may use the sensor data to determine the typical actions and behavior that the device 102 exhibits during selected times of the day. For example, based on the sensor data obtained at various times of the day, the application may determine what times a user is carrying the device 102, what times the user is not carrying the device 102, when the user is running or walking, when the user is most likely sleeping, when the user typically does not use the device 102, when the user typically uses the device 102, when the device 102 is in a pocket or bag of the user, when the user is driving, when the user is at work, when the device 102 is connected to an internet connection, or any other behavior that the device 102 and user may exhibit during various times of the day. In particular, the sensor data may be utilized by the application to predict what happens on the device 102 throughout the course of a day or at any other selected time period.

Once the sensor data is received by the application, the application may be utilized to detect malware and anomalies based on the sensor data obtained from the sensors 110-129. In order to do so, the application may analyze the sensor data obtained from the sensors 110-129 to determine a context of the device 102. In certain embodiments, the sensor data may be obtained and the context of the device 102 may be determined only when the device 102 in the connected state. Typically, when a device, such as device 102, is in a connected state and the device 102 is actively transmitting or receiving data, the power consumption by the device 102 is at its highest. As a result, by activating the sensors 110-129 to obtain samples of sensor data starting at the moment the device 102 transitions from a non-connected state to a connected state, the battery life or power consumption may not be impacted significantly.

Figure 3:
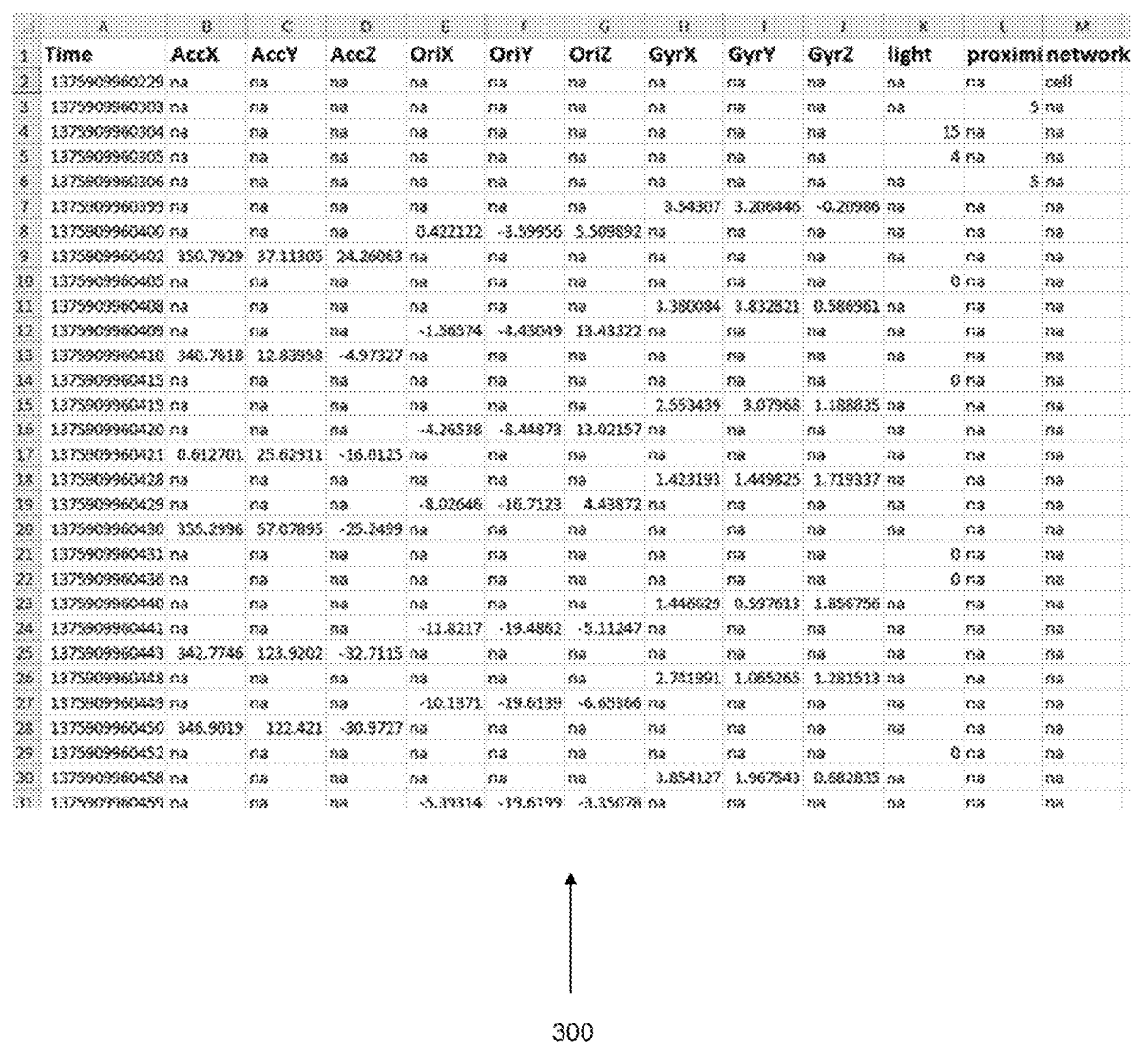

The context of the device 102 may include, but is not limited to, an indication of a physical orientation of the device 102 when the device 102 is in or out of a connected state, an indication of a position of the device 102 when the device 102 is in or out of the connected state, an indication as to how the device 102 is being used when the device 102 is in or out of the connected state, an indication of whether the device 102 is being used by a user when the device 102 is in or out of the connected state, an indication of the speed and acceleration at which the device 102 is moving when the device 102 is in or out of the connected state, an indication of the ambient light around the device 102 when the device 102 is in or out of the connected state, an indication of the proximity of the device 102 to another object when the device 102 is in or out of the connected state, an indication of the device's 102 position on the earth when the device 102 is in or out of the connected state, any other indications associated with the device 102 that may obtained from any type of sensor when the device 102 is in or out of the connected state, or any combination thereof. For example, the context may indicate if the device 102 is in a horizontal position, a vertical position, or an angled position when the device 102 is transmitting traffic. As another example, the context may indicate sub-contexts that may indicate that text messages are being sent or received, that media content is being accessed by the device 102, that a game is being played, that phone calls are being sent or received, or that any other particular action that may be performed by the device 102 is occurring while the device 102 is in the connected state. Additionally, the context may also be determined by the application based on a type of connection that the device 102 uses. For example, the type of connection for the device 102 may be a WiFi connection, a cellular connection, an Ethernet connection, a digital subscriber line connection, a Bluetooth™ connection, no connection, or any type of connection. FIG. 3 illustrates a sample spreadsheet 300 that shows sample sensor data values and measurements obtained from sensors 110-129 and the types of connections utilized by the device 102 at selected time periods.

Based on the context of the device 102 and based on analyzing traffic transmitted received or transmitted while the device 102 is in the connected state, the application may determine if a potential malware infection or anomaly has occurred on the device 102. Malware may include, but is not limited to, computer viruses, ransomware, worms, trojan horses, keyloggers, spyware, adware, and other malicious programs or functions. Anomalies may include, but are not limited to, actions or behavior that occur on the device 102 that would not typically occur or be predicted to occur on the device 102 at a selected time. For example and referring also to FIG. 2, if the context of the device 102 indicates that the device 102 is laying in a flat position and an SMS message was transmitted from the device 102 while the device 102 is in the flat position, the application may transmit an alert or other notification to the device 102 to alert of possible malware or anomalies. Alerts may be transmitted by the application if the context of the device 102 does not correlate with the traffic being transmitted or received. In some embodiments, the context of the device 102 may not correlate with the traffic being transmitted or received by the device 102 if the context would not be expected to occur with the traffic at a selected time period. In certain embodiments, the alert may be a unique sound that can notify the user of possible malware or anomalies, a text message that is displayable on the device 102, a video message that may be displayed on the device 102, an email message sent to an email address associated with the device, or any other type of notification to alert the user of potential malware, anomalies, or both. For example, an alert may be displayed on the screen of the device 102, which may state that a text message with the content "xxxxxxxx" has been sent to the short code "123456" at a specific time.

As another example, if the application determines that an SMS message was transmitted from the device 102 while the device 102 was in a pocket or purse of the user or while the user was moving with the device 102 in the pocket or purse, an alert may be transmitted. The alert may be transmitted because the system 100 may determine that an SMS message would not be expected to be sent while in the user's pocket. Notably, to detect malware or anomalies, the application is not required to identify what kind of activity (in this case the sending of a SMS message) a user or the device 102 was involved in. In order to detect malware or anomalies, the application may detect whether a user was initiating a connection or not based on whether there are any abrupt changes in the sensor data measurements obtained from the sensors 110-129. For example, a user could be walking, driving, or dancing, and also sending a SMS message, however, after sending the SMS message, a user would typically lock device 102, and place the device 102 into his or her pocket. Instead of placing the device 102 into the user's pocket, however, the user may continue to use the device 102, move the device 102 from one hand of the user to another hand, or perform any other action. These different changes in activities may result in changes in the sensor data that is obtained from the sensors 110-129. The changes in the sensor data may be processed by the application to detect whether or not the user was likely to send the SMS message or not, or perform any other activity, at a particular time period. While the activity need not be identified for the detection of malware and anomalies, the activity may be identified based on the sensor data and other information obtained in the system 100, and the identification of the activity may be utilized to further support determinations that malware or anomalies are present. Continuing with the example with the SMS message above, if an SMS message was received on the device 102 while the device 102 was in the user's pocket, then an alert may not be transmitted. An alert may not be sent in this scenario because an SMS message may be expected to be received by the device 102 irrespective of the context of the device 102.

In another example, the application may determine that an alert should not be sent when email traffic or calendar traffic is received by the device 102 while the device 102 is in a flat position, such as on a desk. An alert may not be sent in this scenario because the email traffic or calendar traffic may be expected to be received when the context of the device 102 indicates that the device 102 is in a flat position. This may be the case even if the user is not actively using the device 102. In one example, an alert may not be sent if the user is walking while receiving streamed music because the user may be expected to listen to the music while walking. In another example, an alert may be sent by the application if a hypertext transfer protocol (HTTP) GET attempt is made when the context indicates that the device 102 did not have a connection signal. The alert may be sent in this scenario because the device 102 would not be expected to make such an attempt when a connection signal is not present. In another example, if a transmission is being sent to a destination that is not in a contact list of the device 102 and the context of the device 102 does not match this operation, an alert may be sent. In yet another example, an alert may be sent if the application detects that a program on or accessed by the device 102 is attempting to sign the device 102 up for fraudulent or even legitimate services without the user's consent. In certain embodiments, the application and system 100 may infer that the device 102 is being signed up for fraudulent or even legitimate services without the user's consent because, based on an analysis of the sensor data, the user is not really operating the device 102 while the sign-up process is occurring.

In a further example, an alert may be sent when a certain behavior occurs with respect to the device 102, particularly at an unexpected time. For example, if based on the sensor data, the typical context of the device 102 indicates that the device 102 is typically expected to be flat on a desk at midnight because the user is typically sleeping at that time, but the current context of the device at midnight indicates that the device 102 is in a vertical position and that data is also being transmitted, an alert may be sent to the device 102 or to any other appropriate device. In this scenario, this may indicate that the device 102 was stolen by a thief and that the thief is using the device 102 to send messages. In certain embodiments, the application may generate a score for certain activities that occur on the device 102 based on the type of activity, based on when the activity occurs, and based on the context of the device 102. For example, if the user never uses or minimally uses the device 102 between 12:00 AM and 2:00 AM, then the application may assign a score for that time period. In one embodiment, the score may lie between 0 and 100, with 0 correlating with an expected activity and 100 correlating with an unexpected activity or anomaly. An alert may be sent when a score goes above a threshold score value. For example, if the typical score during the 12:00 AM and 2:00 AM time period is 0, the score measured today is at 60, and the threshold score value is 50, then an alert may be sent to the device 102. Similarly, if the score today is 20, and the threshold score is 50, then perhaps an alert will not be sent to the device 102. Notably, alerts may be sent whenever an unexpected event occurs that does not correlate with the sensor data measurements that have been processed by the system 100, does not correlate with the context determined for the device 102 at a selected time, or both. Furthermore, alerts may be sent to other devices or programs associated with the users, particularly if the device 102 has been compromised or rendered inoperable in some way by malware.

In some scenarios, an alert may not be sent even if the context may indicate that malware or an anomaly is potentially affecting the device 102. For example, traffic from selected sources or destinations, such as destination device 130, may be white-listed by the system 100. Traffic received from certain sources or sent to certain destinations may be categorized in a trusted white list by the system 100 if the traffic, sources, destinations, or any combination thereof, are not known or determined to be associated with malware or anomalies. The white list may include, but is not limited to, trusted uniform resource locators (URLs), domains, IP addresses, short codes, phone numbers, a contact list of the device 102, or other distinguishing identifiers. The white list may be updated by the system 100 as certain sources and destinations are either proven to be trustworthy or proven to be untrustworthy by the system 100. In certain embodiments, if traffic is received from a white-listed source or a sent to a white-listed destination, the application may allow the traffic to go through irrespective of the context of the device 102. However, in other embodiments, if data traffic is received from a white-listed source or a sent to a white-listed destination, and the system 100 determines that based on the context of the device 102 or other information that the traffic is associated with malware or an anomaly, then an alert may still be sent despite the traffic being in the white list.

Similarly, traffic that is received from certain sources or sent to certain destinations, such as destination device 130, may be categorized in a black list by the system 100. Traffic received from certain sources or sent to certain destinations may be categorized in the black list if traffic, sources, destinations, or any combination thereof are determined to be associated with malware or anomalies. The black list may include, but is not limited to, trusted URLs, domains, IP addresses, short codes, phone numbers, or other distinguishing identifiers. The black list may be updated by the system 100 as certain sources and destinations are either proven to be trustworthy or proven to be untrustworthy by the system 100. In certain embodiments, if a black-listed source makes an attempt to send traffic to the device 102 or an attempt is made to send the traffic to a black-listed destination, the application may block the traffic irrespective of the context of the device 102. However, in other embodiments, if a black-listed source makes an attempt to send traffic to the device 102 or an attempt is made to send traffic to a black-listed destination, and the system 100 determines that based on the context of the device 102 or other information that the traffic is not associated with malware or an anomaly, then an alert may not be sent even though the source or destination was originally in the black list.

In addition to sending alerts based on the context of the device 102 and based on an analysis of the traffic being transmitted to or received by the device 102, the application may also may provide the user of the device 102 with various options for dealing with potential malware and anomalies. For example, if the application determines, based on the context, that traffic sent from the device 102 or received at the device 102 appears suspicious, the application may transmit a prompt to the device 102, which may ask the user to confirm that the traffic was indeed intended to be sent or received. At this point, the user may choose not to confirm that the traffic was intended to be sent or received. If this is the case, the system 100 may create an incident report that includes, but is not limited to, all data that is associated with the traffic, what software applications sent or received the traffic, message content associated with the traffic, the destination and source of the traffic, the time the traffic was sent or received, or any other information. The incident report may be transmitted to an operator of the system 100 for further analysis and processing so that certain sources and destinations of traffic may be identified and blocked.

If, on the other hand, the user does confirm that the traffic was indeed intended to be sent or received, then the traffic may be permitted, by the system 100, to continue to be sent or received by the device 102. In certain embodiments, this may occur even if the context indicated possible suspicious activity. As a result, this provides a user with an option to override the determination made by the application and system 100. The application may further provide the user of the device 102 with an option to block or delete an application that has been determined to potentially be malware or is causing an anomaly, and also provide the user with the option to accept an application. In one embodiment, the application may provide the user with an option to disable the device 102 either permanently or temporarily. In certain embodiments, when the application and system 100 detect suspicious activity, but the user confirms that the activity was indeed intended, the detection algorithms of the application and the system 100 may learn automatically and, based on the learning, adjust the way in which detections of suspicious activities are performed in the future.

In certain embodiments, the application may allow for zero-day malware and anomaly detection. Zero-day malware and anomaly detection may be detection of malware and anomalies the same day that the malware or anomalies occur. In some embodiments, zero-day malware detection may be detection of malware as the malware attempts to communicate with the device 102 in real time, when the device 102 attempts to communicate with the malware real time, or both. Similarly, zero-day anomaly detection may be detection of anomalies as they occur in real time.

In further embodiments, the system 100 may incorporate even further features. For example, referring now also to FIG. 4, a classification tree 400 associated with determining the context for the device 102 based on the sensor data obtained from sensors 110-129 is schematically illustrated. As illustrated, based on a comparison of the values of sensor data from the light sensor 127 to mean values for the light sensor 127 for a selected time period, an activity or traffic may be classified by the system 100. Similarly, based on a comparison of the values of the sensor data from the accelerometer 110 to mean values for the accelerometer 110 and to standard deviation values, an activity or traffic may be classified by the system 100. Similar comparisons may be made for all of the sensor data obtained from any of the sensors 110-129. In certain embodiments, the activity or traffic may be classified as suspicious or not suspicious.

In one embodiment, the system 100 may include utilizing any type of sensor. For example, the system 100 may utilize machine-to-machine (M2M) sensors, which may be utilized to collect speed, direction, location, and other information associated with machines, such as vehicles, boats, trains, and planes. The system 100 may use such information to determine the context of various devices associated with such sensors. As an example, the system 100 may utilize information from M2M sensors to determine if data traffic was sent from the vehicle when a driver was not using the steering wheel. By determining the context of the vehicle in this situation, the system 100 may be able to determine if the traffic is suspicious or not suspicious. Additionally, the system 100 may utilize location area code (LAC) information and cell ID (CID) information to determine the context of the machines and the device 102 as well.

Figure 5:
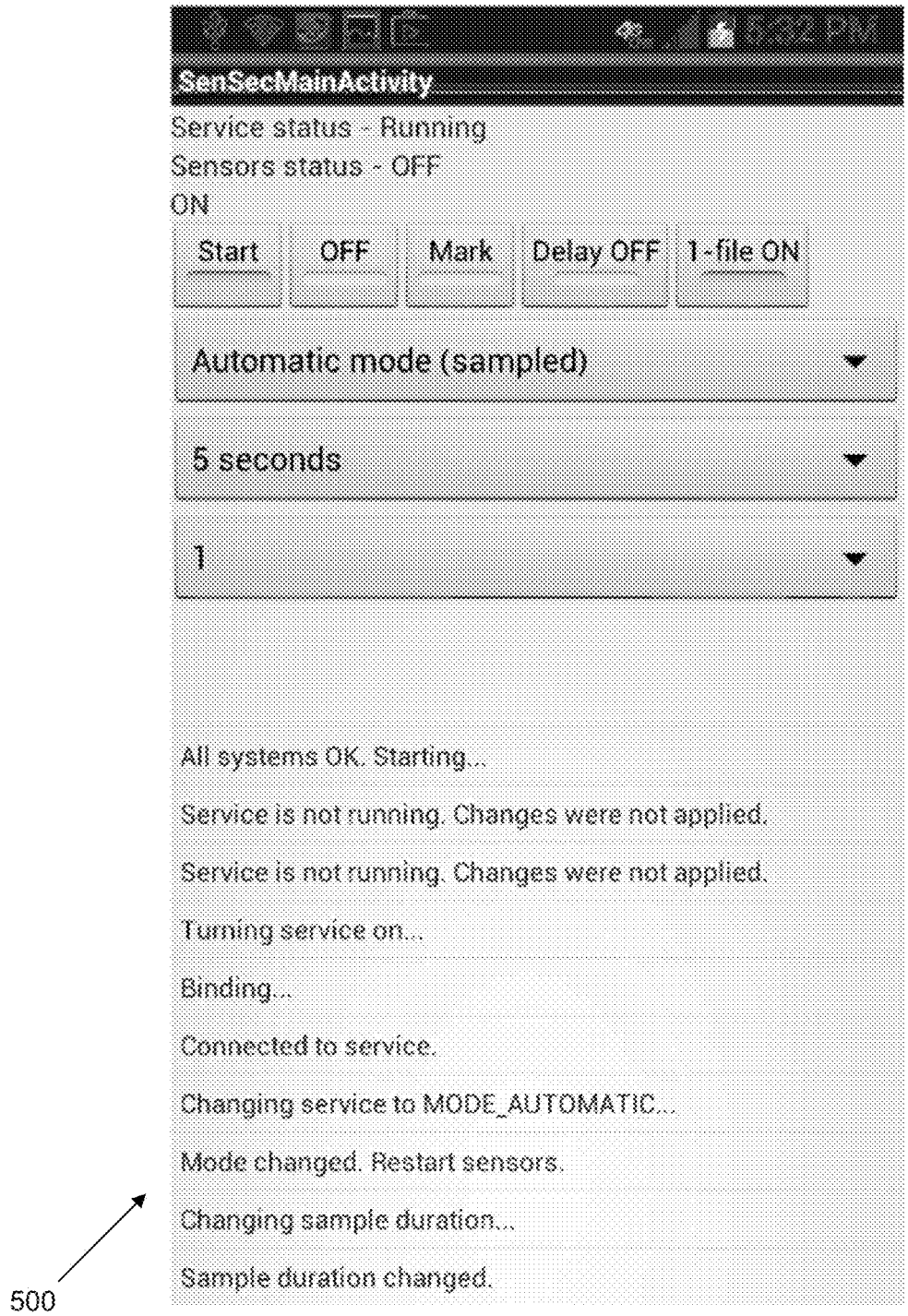
FIG. 5 is a sample user interface of the system of FIG. 1.

Referring now also to FIG. 5, a sample user interface 500 for the system 100 is shown. The user interface 500 may be for the application in the system 100 and may be displayed on device 102. Illustratively, the user interface 500 is shown as including drop down menus for the type of mode for the application can run in and the sample time period for collecting the sensor data from the sensors 110-129. The application may run in an automatic mode or a manual mode. The automatic mode may indicate that the application automatically runs at certain times of the day, and the manual mode may require the user to manually select when the application runs. The user interface 500 may enable a user to set the time when the sensors 110-129 should be activated and deactivated, to turn the application on or off, to mark or flag certain detected traffic, to store determined contexts for the device 102, to change the sampling time period for collecting the sensor data, and to perform any of the other operations disclosed for the system 100 and application.

Notably, as shown in FIG. 1, the system 100 may perform any of the operative functions disclosed herein by utilizing the processing capabilities of server 160, the storage capacity of the database 155, or any other desired component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, activating or deactivating the sensors 110-129, analyzing the sensor data obtained from the sensors 110-129, determining the context of the device 102 based on the sensor data and connection information, determining if traffic received or transmitted by the device 102 during a connected state is associated with a white list or black list, transmitting an alert if the traffic received or transmitting during the connected state is not in a white list or the context does not correlate with the traffic, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including device 102, destination device 130, communications network 135, server 140, server 145, server 150, server 160, and database 155. However, the system 100 may include multiple devices 102, multiple destination devices 130, multiple communications networks 135, multiple servers 140, 145, 150, and 160, multiple databases 155, or any number of any of the other components in the system 100. Furthermore, in one embodiment, substantial portions of the functionality and operations of the system 100 may be performed by other networks and systems that are connected to system 100.

Figure 6:
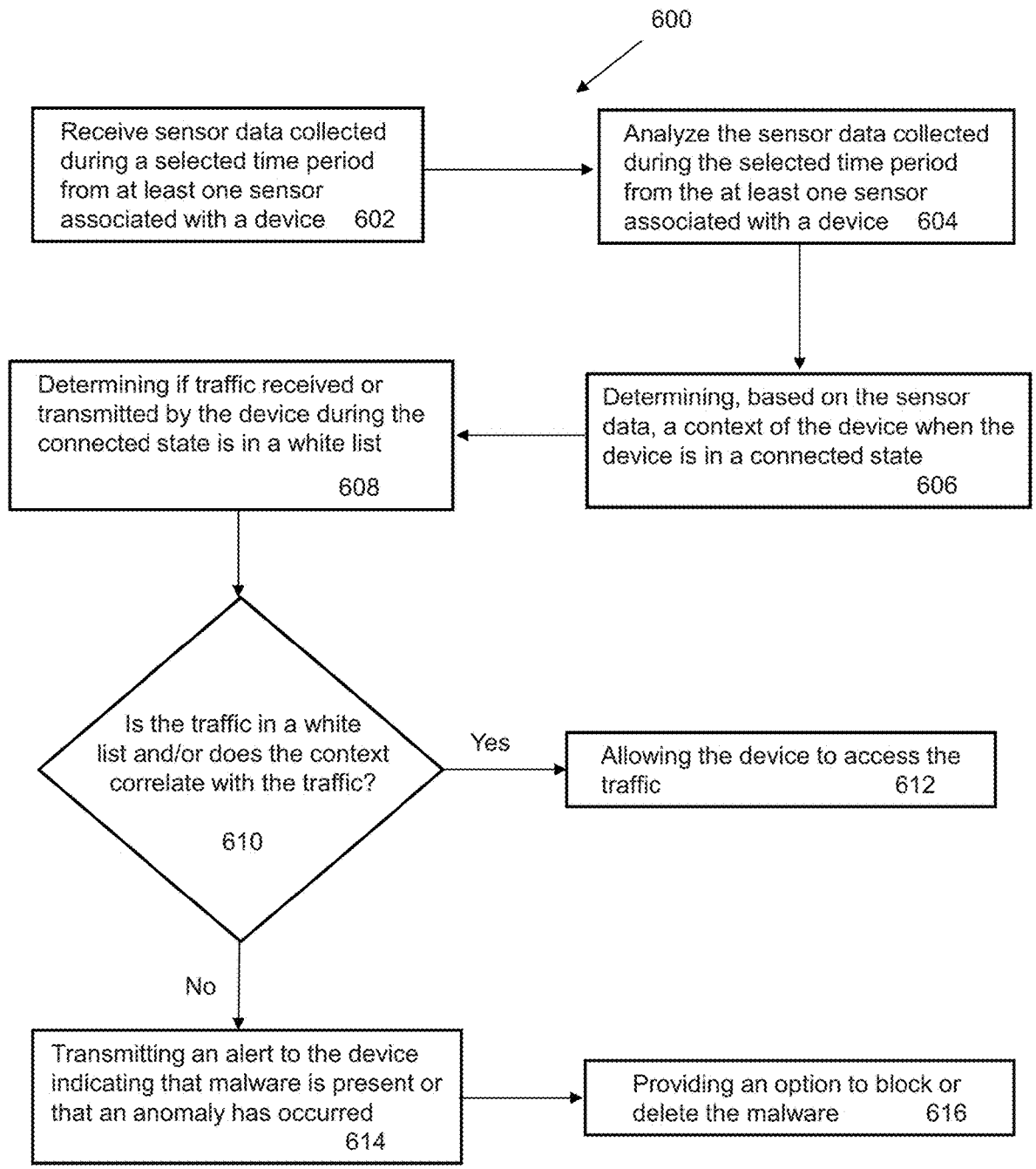
FIG. 6 is a flow diagram illustrating a sample method for providing malware and anomaly detection via activity recognition based on sensor data according to an embodiment of the present disclosure.

As shown in FIG. 6, an exemplary method 600 for providing malware and anomaly detection via activity recognition based on sensor data is schematically illustrated, and may include, at step 602, receiving sensor data collected during a selected time period from one or more sensors 110-129 associated with a device 102. In one embodiment, the sensor data may be obtained by the application running on the device 102, the servers 140, 145, 150, and 160, the database 155, any combination thereof, or other appropriate device. At step 604, the method 600 may include analyzing the sensor data collected during the selected time period from the one or more sensors 110-129 associated with the device 102. In one embodiment, the sensor data may be analyzed by the application running on the device 102, the servers 140, 145, 150, and 160, any combination thereof, or other appropriate device. The method 600 may include, at step 606, determining, based on the sensor data, a context of the device 102 when the device is in a connected state. In one embodiment, the context of the device 102 may be determined by the application running on the device 102, the servers 140, 145, 150, and 160, any combination thereof, or other appropriate device.

At step 608, the method 600 may include determining if traffic received or transmitted by the device 102 while in the connected state is in a white list. In one embodiment, the determination of whether the traffic is in the white list may be performed by the application running on the device 102, the servers 140, 145, 150, and 160, any combination thereof, or other appropriate device. At step 610, the method 600 may include determining if the traffic is in the white list, if the context of the device 102 correlates with the traffic, or a combination thereof. In one embodiment, these determinations may be performed by the application running on the device 102, the servers 140, 145, 150, and 160, any combination thereof, or other appropriate device. If the traffic is determined to be in the white list and the context correlates with the traffic, then the method 600 may include, at step 612, allowing the device 102 to access the traffic, to communicate with a source of the traffic, or communicate with a destination that is to receive the traffic.

However, if the traffic not in the white list or if the context does not correlate with the traffic, the method 600 may include, at step 614, transmitting an alert to the device 102 indicating that malware may be present or that an anomaly occurred. In one embodiment, the alert may be transmitted by the application running on the device 102, the servers 140, 145, 150, and 160, any combination thereof, or other appropriate device. At step 616, the method 600 may include providing an option to a user of the device 102 to block, delete, or otherwise prevent the malware from accessing the device 102. In one embodiment, the option may be provided by the application running on the device 102, the servers 140, 145, 150, and 160, any combination thereof, or other appropriate device. In one embodiment, the system 100 and methods described herein may further include utilizing any of the various components described in the system 100 to perform the operative functions disclosed herein.

It is important to note that the methods described above may incorporate any of the functionality, devices, and/or features of the system 100 and subsystems described above, or otherwise, and are not intended to be limited to the description or examples provided herein.

Figure 7:
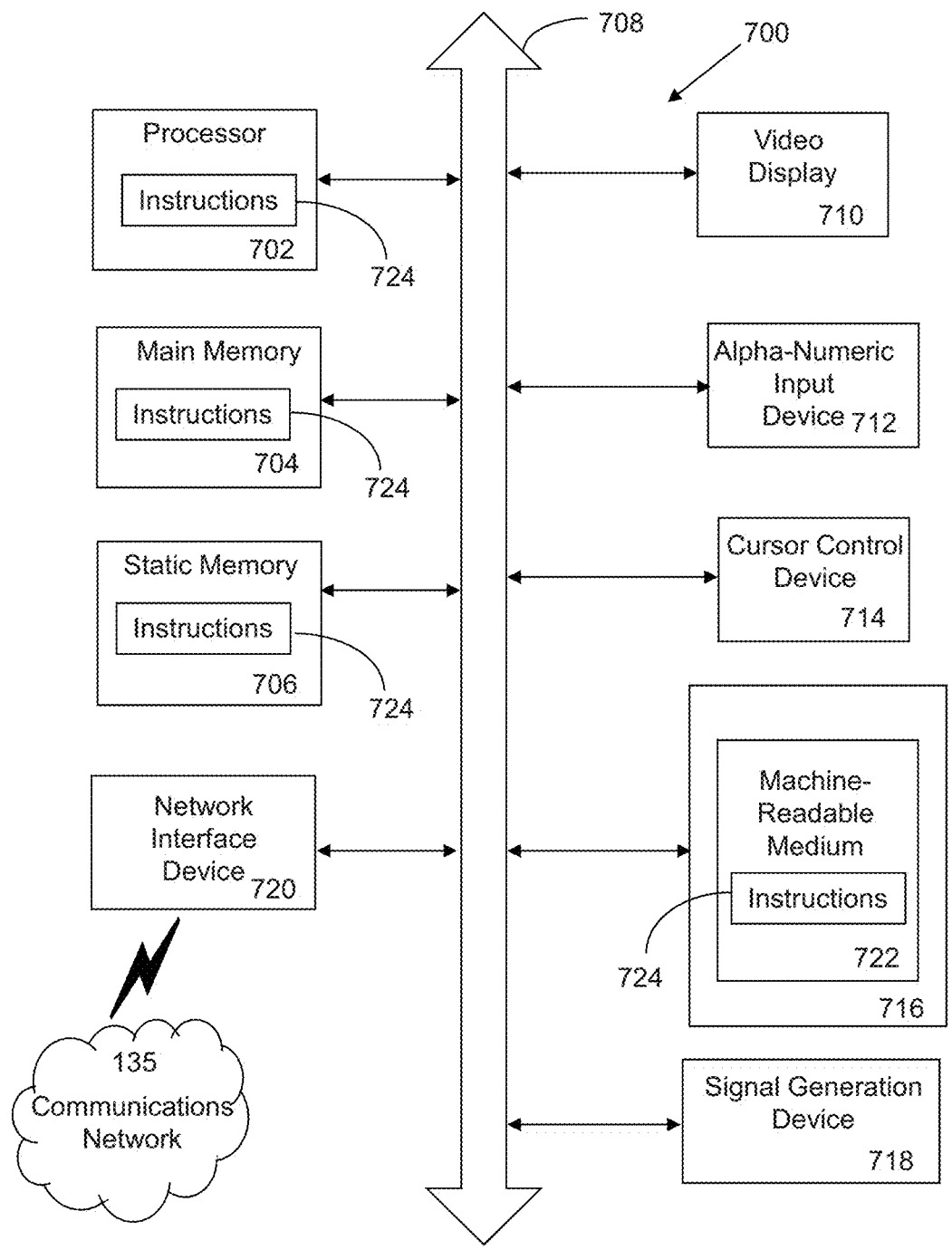
FIG. 7 is a schematic diagram of a machine in the form of a computer system within which a set of instructions, when executed, may cause the machine to perform any one or more of the methodologies or operations of the systems and methods for providing malware and anomaly detection via activity recognition based on sensor data.

Referring now also to FIG. 7, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines, such as, but not limited to, the device 102, the destination device 130, the server 140, the server 145, the server 150, the database 155, the server 160 or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 722 containing instructions 724 so that a device connected to the communications network 135, other network, or both, can send or receive voice, video or data, and to communicate over the communications network 135, other network, or both, using the instructions. The instructions 724 may further be transmitted or received over the communications network 135, other network, or both, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" or "machine-readable device" may be non-transitory. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system comprising:
a memory that stores instructions;
a processor that executes the instructions to perform operations, the operations comprising:
obtaining sensor data from at least one sensor associated with a device;
determining a context of the device when the device is in a connected state, wherein the context of the device is determined based on the sensor data from the at least one sensor, wherein the context of the device comprises an indication of ambient light around the device and an indication of a proximity of the device to an object; and
transmitting an alert when the context does not correlate with a type of received traffic or a type of transmitted traffic at the device, wherein the type of the received traffic or the type of the transmitted traffic comprises an email message or a text message.

2. The system of claim 1, wherein the operations further comprise:
activating the at least one sensor associated with the device when the device is in the connected state.

3. The system of claim 2, wherein the operations further comprise:
deactivating the at least one sensor when a selected time period has expired.

4. The system of claim 1, wherein the operations further comprise:
assigning a source of the received traffic or a destination of the transmitted traffic to a black list when the source of the received traffic or the destination of the transmitted traffic is determined to not be in a white list.

5. The system of claim 1, wherein the operations further comprise:
providing, with the alert, an option to block an application associated with the received traffic or the transmitted traffic.

6. The system of claim 1, wherein the operations further comprise:
assigning a score to the context determined for the device.

7. The system of claim 6, wherein the operations further comprise:
determining that the context does not correlate with the type of the received traffic or the type of the transmitted traffic when the score for the context is greater than a threshold level.

8. The system of claim 1, wherein the context of the device further comprises an indication of an acceleration of the device.

9. A method comprising:
obtaining, by a processor, sensor data from at least one sensor associated with a device;
determining, by the processor, a context of the device when the device is in a connected state, wherein the context of the device is determined based on the sensor data from the at least one sensor, wherein the context of the device comprises an indication of ambient light around the device and an indication of a proximity of the device to an object; and
transmitting, by the processor, an alert when the context does not correlate with a type of received traffic or a type of transmitted traffic at the device, wherein the type of the received traffic or the type of the transmitted traffic comprises an email message or a text message.

10. The method of claim 9, further comprising:
activating the at least one sensor associated with the device when the device is in the connected state.

11. The method of claim 10, further comprising:
deactivating the at least one sensor when a selected time period has expired.

12. The method of claim 9, further comprising:
assigning a source of the received traffic or a destination of the transmitted traffic to a black list when the source of the received traffic or the destination of the transmitted traffic is determined to not be in a white list.

13. The method of claim 9, further comprising:
providing, with the alert, an option to block an application associated with the received traffic or the transmitted traffic.

14. The method of claim 9, further comprising:
assigning a score to the context determined for the device.

15. The method of claim 14, further comprising:
determining that the context does not correlate with the type of the received traffic or the type of the transmitted traffic when the score for the context is greater than a threshold level.

16. The method of claim 9, wherein the context of the device further comprises an indication of an acceleration of the device.

17. A computer-readable device comprising instructions, which when executed by a processor, cause the processor to perform operations, the operations comprising:
- obtaining sensor data from at least one sensor associated with a device;
- determining a context of the device when the device is in a connected state, wherein the context of the device is determined based on the sensor data from the at least one sensor, wherein the context of the device comprises an indication of ambient light around the device and an indication of a proximity of the device to an object; and
- transmitting an alert when the context does not correlate with a type of received traffic or a type of transmitted traffic at the device, wherein the type of the received traffic or the type of the transmitted traffic comprises an email message or a text message.

18. The computer-readable device of claim 17, wherein the operations further comprise:
- activating the at least one sensor associated with the device when the device is in the connected state.

19. The computer-readable device of claim 18, wherein the operations further comprise:
- deactivating the at least one sensor when a selected time period has expired.

20. The computer-readable device of claim 17, wherein the operations further comprise:
- assigning a source of the received traffic or a destination of the transmitted traffic to a black list when the source of the received traffic or the destination of the transmitted traffic is determined to not be in a white list.

* * * * *